(12) United States Patent
Sauer et al.

(10) Patent No.: US 9,357,869 B2
(45) Date of Patent: Jun. 7, 2016

(54) MASTICATING SEPARATOR FOR SEPARATING FRUIT OR VEGETABLE JUICE FROM FRUIT OR VEGETABLE PULP

(75) Inventors: Stefan Sauer, Voelkermarkt (AT); Theodoor Stolk, Langezwaag (NL); Marjan Willeke Esther Cornelissen, Groningen (NL)

(73) Assignee: KONINKLIJKE PHILIPS N.V., EINDHOVEN (NL)

( * ) Notice: Subject to any disclaimer, the term of this patent is extended or adjusted under 35 U.S.C. 154(b) by 110 days.

(21) Appl. No.: 14/232,786

(22) PCT Filed: Jul. 12, 2012

(86) PCT No.: PCT/IB2012/053570
§ 371 (c)(1),
(2), (4) Date: Jan. 14, 2014

(87) PCT Pub. No.: WO2013/011429
PCT Pub. Date: Jan. 24, 2013

(65) Prior Publication Data
US 2014/0196613 A1    Jul. 17, 2014

Related U.S. Application Data

(60) Provisional application No. 61/508,121, filed on Jul. 15, 2011.

(30) Foreign Application Priority Data

Jul. 15, 2011    (EP) .................................... 11174101

(51) Int. Cl.
*A23B 5/00*    (2006.01)
*A23N 1/00*    (2006.01)
(Continued)

(52) U.S. Cl.
CPC .............. *A47J 19/027* (2013.01); *A47J 19/025* (2013.01); *A47J 19/06* (2013.01)

(58) Field of Classification Search
CPC ........ A47J 19/025; A47J 19/027; A47J 19/06
USPC .................... 99/495, 496, 501, 502, 511, 512
See application file for complete search history.

(56) References Cited

U.S. PATENT DOCUMENTS

| 3,976,001 A | 8/1976 | Trovinger |
| 4,363,265 A | 12/1982 | Tankioka et al. |

(Continued)

FOREIGN PATENT DOCUMENTS

| CN | 201631035 U | 11/2010 |
| EP | 1283013 A2 | 2/2003 |
| GB | 983894 A | 2/1965 |

*Primary Examiner* — Dana Ross
*Assistant Examiner* — Lindsey C Teaters

(57) ABSTRACT

The present invention relates to a masticating separator for separating fruit or vegetable juice from fruit or vegetable pulp. The masticating separator comprises a housing (21), an inner wall (43) in the housing (21), an auger (22,71) rotatably mounted in the housing (21), a cavity (46) defined between an outer surface (39,86) of the auger (22,71) and the inner wall (43) to receive pulp and juice, and a juice passageway (44) separated from the cavity (46). An elongate aperture (52) is formed in the inner wall (43) extending between the cavity (46) and the juice passageway (44). Therefore, when the auger (22,71) is rotated about its longitudinal axis to urge pulp and juice along the cavity (46), juice in the cavity (46) is urged to flow through the aperture (52) to the juice passageway (44).

14 Claims, 8 Drawing Sheets

(51) Int. Cl.
*A47J 43/14* (2006.01)
*B02C 15/00* (2006.01)
*B04B 5/10* (2006.01)
*A47J 19/02* (2006.01)
*A47J 19/06* (2006.01)

(56) References Cited

U.S. PATENT DOCUMENTS

| 5,906,154 | A | * | 5/1999 | Yoon | A23N 1/00 100/117 |
|---|---|---|---|---|---|
| 6,637,323 | B2 | * | 10/2003 | Kim | A47J 19/025 100/117 |
| 2004/0231529 | A1 | * | 11/2004 | Jan | A23N 1/00 99/495 |
| 2007/0277682 | A1 | | 12/2007 | Wong | |
| 2009/0064875 | A1 | * | 3/2009 | Trovinger | A23N 1/02 99/492 |
| 2012/0137899 | A1 | * | 6/2012 | Kim | A47J 19/025 99/509 |
| 2012/0266762 | A1 | * | 10/2012 | Wang | A47J 19/025 99/504 |

* cited by examiner

MASTICATING SEPARATOR FOR SEPARATING FRUIT OR VEGETABLE JUICE FROM FRUIT OR VEGETABLE PULP

CROSS-REFERENCE TO PRIOR APPLICATIONS

This application is the U.S. National Phase application under 35 U.S.C. §371 of International Application No. PCT/IB2012/053570, filed on Jul. 12, 2012, which claims the benefit of U.S. Provisional Patent Application No. 61/508,121, filed Jul. 15, 2011 and European Patent Application No. 11174101.3, filed on Jul. 15, 2011. These applications are hereby incorporated by reference herein.

FIELD OF THE INVENTION

The present invention relates to a masticating separator for separating fruit or vegetable juice from fruit or vegetable pulp.

BACKGROUND OF THE INVENTION

Juicers for foodstuffs, such as fruit or vegetables, are well known for separating juice from pulp. Such apparatus are highly popular because of their health and taste benefits. One of the main forms of juicer is a masticating juicer.

A masticating juicer is shown in FIG. 1. Such a juicer 1 comprises a housing 2 with a motor driven auger 3 which is rotatably mounted in the housing 2. The auger 3 has an outer face 4 with a helical screw or blade 5 extending therearound. A conically shaped sieve 6 is disposed in the housing 2 and is spaced from an inner surface 7 of the housing 2 to define a juice passageway 8 between the sieve 6 and the housing 7. A juice outlet 9 extends through the housing 2 from the juice passageway 8. The auger 3 is disposed in a conically shaped sieve 6, and is rotatable in the sieve 6 about its longitudinal axis. One end 10 of the housing is open to form a pulp outlet 11 and a fruit or vegetable inlet 12 is formed through the housing 2 to allow fruit or vegetable to be inserted into the juicer.

When a user inserts a fruit or vegetable into the housing 2 though the inlet 12 the fruit or vegetable is received between the housing inner surface 7 and the auger 3. The auger 3 is slowly rotated about its longitudinal axis by a manual handle or a motor (not shown), and the fruit or vegetable is crushed by the helical blade 5. The crushed fruit or vegetable is urged along the housing 2, towards the sieve 6 and the pressure imparted on the crushed pulp and juice increases as it is urged along the housing due to the area of the chamber 13 formed between the conically shaped sieve 6 and auger 3 reducing as the sieve converges towards the open end 10 of the housing 2. Therefore, the juice is urged to flow through the holes formed in the sieve 6 into the juice passageway 8, and out through the juice outlet 9. The pulp is then ejected from the housing 2 at the open end 10 through the pulp outlet 11.

However, one problem with a masticating juicer is that it is difficult and time consuming for a user to clean. In particular, the fibres of the pulp get stuck in the perforations of the sieve and so a user has to brush the sieve by hand to clean it.

SUMMARY OF THE INVENTION

Therefore, it is an object of the invention to provide a masticating separator for separating fruit or vegetable juice from fruit or vegetable pulp which substantially alleviates or overcomes the problems mentioned above.

According to the present invention, there is provided a masticating separator for separating fruit or vegetable juice from fruit or vegetable pulp comprising a housing, an inner wall in the housing, an auger rotatably mounted in the housing, a cavity defined between an outer surface of the auger and the inner wall to receive pulp and juice, and a juice passageway separated from the cavity, wherein an elongate aperture is formed in the inner wall extending between the cavity and the juice passageway, so that, when the auger is rotated about its longitudinal axis to urge pulp and juice along the cavity, juice in the cavity is urged to flow through the aperture to the juice passageway.

The above arrangement enables juice to be extracted from a fruit or vegetable pulp without the need for a sieve. This simplifies the arrangement of a masticating separator and makes a masticating separator easier to clean.

Advantageously, the inner wall is conically shaped.

The effect of this arrangement is to produce a pressure increase along the cavity.

Conveniently, the elongate aperture extends circumferentially around the inner wall.

Therefore, the flow of juice from the chamber is possible all the way around the body.

A pulp outlet is formed at one end of the housing and the auger is configured to urge pulp and juice towards said pulp outlet.

One advantage of this arrangement is that pulp is easily guided from the chamber.

Conveniently, the aperture is spaced from the pulp outlet.

An effect of this arrangement is to ensure a good juice extraction efficiency.

In one embodiment, the aperture is disposed proximate an opposing end of the inner wall to the pulp outlet.

An advantage of this arrangement is to ensure that the maximum quantity of juice is extracted from the pulp.

The inner wall may comprise a first part and a second part, the first and second parts being separable along the aperture.

The effect of this arrangement is that it enables the aperture to be easily cleaned, and prevents fibres from becoming trapped in the aperture.

The first part may be removably received in the housing.

This arrangement aids cleaning of the first part of the inner wall and the aperture by improving accessibility.

In one embodiment, the second part may be removably received in the housing.

This arrangement aids cleaning of the second part of the inner wall.

In another embodiment, the second part is integrally formed with the housing.

The second part being integrally formed with the housing may reduce the number of components, and simplify assembly of the masticating separator.

The first part may have an end face which is spaced from an opposing end face of the second part to form the aperture.

An advantage of the above arrangement is that assembly of the masticating separator is simplified.

The masticating separator may further comprise a spacer means configured to space the end face of the first part from the opposing end face of the second part.

One advantage of this arrangement is that it ensures that a consistent aperture gap is maintained.

Advantageously, the spacer means protrudes from one of the opposing end faces and locates against the opposing end face to space the first part from the second part. Therefore, a consistent aperture gap is formed between the opposing end faces.

Conveniently, the juice passageway is formed between the inner wall and the housing.

The masticating separator may further comprise a base to support the housing on a surface, wherein the longitudinal axis of the auger is configured to extend at an angle to a surface on which the juicer is disposed.

One advantage of the auger being arranged to extend at an angle to a surface on which the juicer is disposed is that it allows gravity to be used to feed a fruit or vegetable through the masticating separator, and for juice to flow from the housing.

Advantageously, the longitudinal axis of the auger is configured to upstand from the base, perpendicular to a surface on which the base is disposed.

An advantage of the auger being disposed to rotate about a vertically extending axis is that it reduces the space required by the masticating separator.

According to another aspect of the invention, there is provided a juicer for extracting fruit and or vegetable juice from pulp comprising a masticating separator according to any preceding claim.

According to another aspect of the invention, there is provided a masticating separator for separating fruit or vegetable juice from fruit or vegetable pulp comprising a body with a base configured to support the body on a horizontal surface, an auger rotatably mounted in the body about a rotational axis, wherein the rotational axis of the auger is configured to extend at an oblique angle to the base.

With the above arrangement, it is possible to maximise the dimensions of the fruit or vegetable inlet. Furthermore, it is possible to provide a self-feeding arrangement for feeding fruit or vegetables to the auger without the need to urge the fruit or vegetable towards the auger.

An opening may be formed in a side wall of the body extending around the auger to act as a fruit or vegetable inlet so that a fruit or vegetable is feedable to the auger, and at least the portion of the side wall in which the inlet is formed extends at an oblique angle to the rotational axis of the auger.

Therefore, the area of the opening may be maximised.

The auger may comprise a chopping portion and a pressing portion.

Therefore, it is possible for the auger to chop a fruit or vegetable and to press the fruit or vegetable.

The opening may be configured to face the chopping portion.

Therefore, the fruit or vegetable fed through the opening is guided to the chopping portion.

The housing may further comprise an elongate passage configured to feed a fruit or vegetable to the opening and the longitudinal axis of the elongate passage may extend at an oblique angle to the rotational axis of the auger.

A cutting edge of the chopping portion may extend at an oblique angle to the rotational axis of the auger.

The base may be defined by a base surface.

The base may be defined by two or more surface portions which are spaced from each other. The base surfaces may be feet.

The body may comprise a base unit defining the base and a housing mountable to the base unit.

The auger may be received in a chamber formed by the housing.

The chamber may be elongate and may converge towards each end.

The housing may comprise first and second portions which are separable from each other.

The above arrangement allows the housing and auger to be easily cleaned.

The first portion may have a juice outlet, and the second portion has a sieve configured to extend over the juice outlet when the first and second portions are mounted to each other.

The above arrangement enables the sieve to be easily cleaned.

The masticating separator may further comprise a housing, an inner wall in the housing, a cavity defined between an outer surface of the auger and the inner wall to receive pulp and juice, and a juice passageway separated from the cavity, wherein an elongate aperture is formed in the inner wall extending between the cavity and the juice passageway so that, when the auger is rotated about its longitudinal axis to urge pulp and juice along the cavity, juice in the cavity is urged to flow through the aperture to the juice passageway.

The invention could also be applied in relation to a soymilk maker, wherein the soymilk maker comprises a masticating separator for separating soy milk from soy pulp comprising a housing, an inner wall in the housing, an auger rotatably mounted in the housing, a cavity defined between an outer surface of the auger and the inner wall to receive soy pulp and soy milk, and a soy milk passageway separated from the cavity, wherein an elongate aperture is formed in the inner wall extending between the cavity and the soy milk passageway so that, when the auger is rotated about its longitudinal axis to urge soy pulp and soy milk along the cavity, soy milk in the cavity is urged to flow through the aperture to the soy milk passageway.

Any embodiment of the invention relating to juicers may also be applicable in the field of soy milk making.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
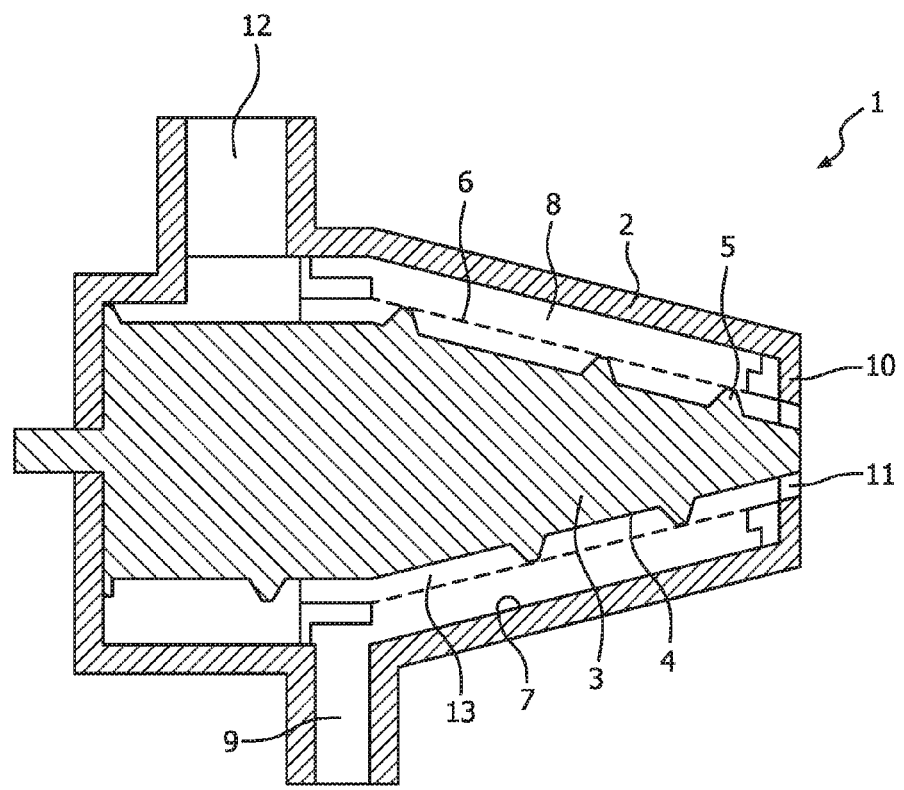
FIG. 1 shows an illustrative cross-sectional view of a conventional masticating separator for separating a fruit or vegetable juice from a pulp.
Figure 2:
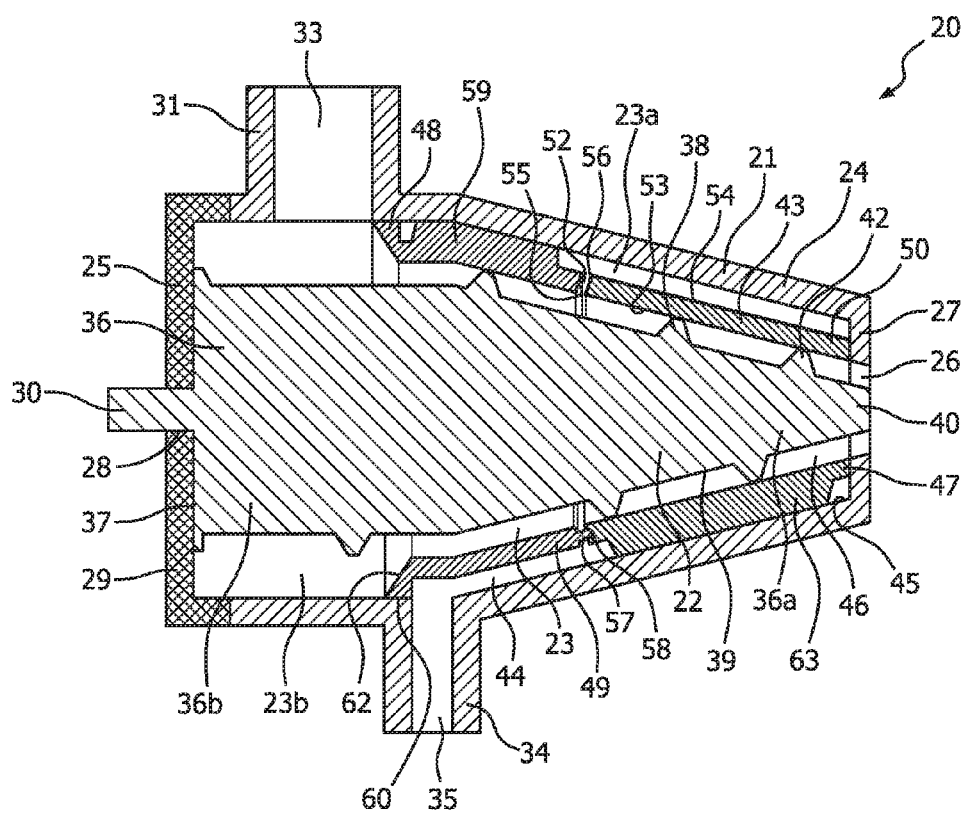
FIG. 2 shows an illustrative cross-sectional view of a masticating separator for separating a fruit or vegetable juice from a pulp according to one embodiment of the invention.

Referring now to FIG. 2, a masticating separator 20 acting as a masticating juicer for separating fruit or vegetable juice from pulp is shown comprising a housing 21 and a rotatable auger 22 disposed in the housing 21.

A chamber 23 is formed in the housing to receive the rotatable auger 22, and the housing 21 is separable into a front portion 24 and a rear portion 25 to allow access to the chamber 23, so that the auger 22 is removable from the housing 21 for cleaning, as will become apparent hereinafter.

The chamber 23 comprises a cylindrical section 23b and a conical portion 23a. A front end of the housing 21 is open to form a pulp outlet 26 through which pulp is discarded from the housing 21, as will become apparent hereinafter. The pulp outlet 26 is formed in an end wall 27 which communicates between the chamber 23 and outside the housing 21. A cylindrical hole 28 is formed through a rear wall 29 formed by the housing rear portion 25 through which a shaft 30 to drive the rotatable auger 22 extends.

A passage 31 is formed at an upper end of the housing 21 and communicates with the chamber 23 proximate to the rear end of the housing 21 to act as an inlet 33 through which a fruit or vegetable is inserted into the chamber 23. Similarly, a pipe 34 extends from a lower end of the housing 21 to form a juice outlet 35, as will become apparent hereinafter, and communicates with the chamber 23 proximate to the junction between the cylindrical section 23a and conical section 23b.

The auger 22 has a body 36 with a conical portion 36a and a cylindrical portion 36b extending from the end of the cylindrical portion 36a. The shaft 30 is fixedly mounted to the body 36 and extends from a rear end 37 of the body 36 along the longitudinal axis of the auger 22. The shaft 30 is driven by a motor (not shown) in a conventional manner, so that the shaft 30, and therefore the auger 22, is rotated when the motor is operated. A helical screw or blade 38 extends around an outer surface 39 of the body 36 from the rear end 37 to a front end 40. In this embodiment a free edge 42 of the helical blade 38 is spaced equidistant from the outer surface 39 of the auger body 36 along its length, however it will be appreciated that the height of the blade 38 may vary along its length.

An inner wall 43 is disposed in the housing 21. The inner wall 43 is removably received in the chamber 23, and extends along the conically-shaped portion 23a of the chamber 23 from the front end of the housing 21 and over the juice outlet 35. The inner wall 43 divides the chamber 23 in the housing 21 into a juice passageway 44 defined between the inner wall 43 and an inner surface 45 of the housing 21, and a cavity 46 defined between the inner wall 43 and the outer surface 39 of the auger body 36. A front end 47 of the inner wall 43 abuts the end wall 27 to form a seal therewith and a circumferential outwardly-extending flange 48 is formed at a rear end of the inner wall 43 and abuts against the inner surface 45 of the housing 21 to form a fluid seal therewith.

The juice passageway 44 extends circumferentially around the inner wall 43 and fluidly communicates with the juice outlet 35.

The inner wall 43 comprises a first part 49 and a second part 50. Each of the first and second parts 49, 50 is an insert which is removably received in the chamber 23 and together they form the inner wall 43. An elongate aperture 52 is formed between the first and second parts 49, 50, and extends arcuately around the inner wall 43. In this embodiment, the elongate aperture 52 extends circumferentially around the inner wall 43 and through the inner wall 43 from an inner face 53 to an outer face 54 so that the cavity 46 fluidly communicates with the juice passageway 44. The inner face 53 of the inner wall 43 is planar, such that it does not have any holes formed through it, with the exception of the aperture 52.

The first part 49 of the inner wall 43 has a planar end face 55 which is disposed adjacent to, but spaced from, a planar end face 56 of the second part 50 when the first and second parts 49, 50 are received in the housing 21.

Spacer elements 57 upstand from the first part end face 55. The spacer elements 57 act as a spacing means to space the first part end face 55 from the second part end face 56, as will become apparent hereinafter. The spacer elements 57 are disposed at regular intervals around the end face 55. Although the spacer elements up stand from the first part end face 55 and locate against the second part end face 56 in this embodiment, it will be appreciated that the spacer elements may extend from the second part end face 56 and locate against the first part end face 55. Alternatively, the first part may be spaced from the second part by a shoulder upstanding from the housing.

One or more of the spacer elements 57 has a locating key 58 protruding therefrom to receive a corresponding locating recess formed in the second part end face 56 to correctly position the first and second parts 55, 56 with respect to each other.

The first part 49 of the inner wall 43 is generally conically-shaped. Longitudinally extending ribs 59 extend radially from the outer face 54 of the first part 49 and are spaced around the first part 49 to abut against the inner surface 45 of the housing 21 and locate the first part 49 in the housing 21. Therefore, the outer face 53 of the first part is spaced from the inner surface 45 of the housing 21 to define the juice passageway 44. The flange 48 extends circumferentially around the first part 49 at an opposing end of the first part 49 to the end face 55 and a distal edge 60 of the flange 48 locates against the inner surface 45 of the housing 21 to form a seal thereagainst. It will be appreciated that such a sealing arrangement prevents the flow of pulp between the housing 21 and the inner wall 43 and into the juice passageway 44. The flange 48 has an inclined face 62 which converges from the flange distal edge 60 to the inner wall inner face 53 to funnel juice and pulp into the cavity 46.

The second part 50 of the inner wall 43 is conically-shaped and extends parallel to the first part 49. It is disposed in the housing 21 between the first part 49 and the end wall 27 of the housing 21 and forms the circumferentially extending front end 47 of the inner wall which abuts against the end wall 27 to seal thereagainst. Longitudinally extending ribs 63 extend radially from the outer face 54 of the second part 50 and are spaced around the second part 50 to abut against the inner surface 45 of the housing 21 and locate the second part 50 in the housing 21.

When the first and second parts 49, 50 are disposed in the housing 21 and located relative to each other, the opposing end faces 55, 56 of the two parts of the inner wall 43 are brought together such that they extend circumferentially parallel to, but spaced from, each other. The spacer elements 57 maintain a uniform spacing between the first and second parts 49, 50 so that the aperture 52 has a uniform spacing therearound. In the present embodiment the minimum width of the aperture 52 determined by the minimum gap between the opposing end faces 55, 56 is approximately 0.3 mm, although it will be appreciated that the width of the aperture 52 may be varied, for example the width of the aperture may be 0.1 mm.

Although the opposing end faces 55, 56 are shown extending parallel to, but spaced from, each other it will be appreciated that in cross-section (as shown in FIG. 2) the width of the gap of the aperture 52 between the opposing end faces 55, 56 may vary in a radial direction between the opening to the aperture 29 and an outer exit to the aperture 52, so that the width of the aperture 52 increases or decreases from the opening to the aperture 52 to the exit in a radial direction. The width of the aperture 52 from the opening to the exit in a radial direction may converge or diverge in a linear or non-linear manner, and so it will be understood that such cross-sectional increase or decrease in the width of the aperture may have a linear or non-linear mathematical function, as well as a continuous or discontinuous mathematical function. Alternatively, the aperture has a labyrinth arrangement in cross-section.

Although not shown in the Figures, in an alternative embodiment one or both of the inner edges of the first and second parts 49, 50 is inclined at an angle to the inner face 53 of the inner wall 43 and the end faces 55, 56 to form a converging mouth to the aperture 52 which extends circumferentially around the inner wall 43. An advantage of the funnel-shaped mouth is that it urges pulp fibres to converge towards the aperture 52 and so increases the efficiency of the cake filtration process.

When the juice separator is assembled, the inner wall 43 is received in the housing 21 and located in position so that the juice passageway 44 is defined, and the auger 22 is received in the housing 21, so that the cavity is defined. The auger 22 is rotatably mounted in the housing and the shaft 30 extends from the rear end of the housing 21 and is connected to a motor (not shown) or a manually operated handle (not shown).

The user then operates the juice separator so that the rotating body 22 is driven by the motor 25, or manually rotates the handle, so that the auger 22 rotates in the housing about its longitudinal axis.

The outer surface 39 of the auger 22 extends parallel to, but spaced from, the inner face 53 of the inner wall 43 along the longitudinal axis of the auger 22. Therefore the gap between the auger 22 and the inner wall 43 remains constant. However, it will be appreciated that in an alternative embodiment the gap between the auger 22 and the inner wall 43 may vary, for example by the outer surface 39 of the auger 22 converging towards the inner face 53 of the inner wall 43. The free edge 42 of the helical blade 38 lies adjacent to the inner wall 43.

A fruit or vegetable is inserted into the housing 21 through the passage 31 formed at an upper end of the housing 21 and is guided onto the auger 22. The fruit or vegetable is then crushed between the auger 22 and the housing 21 due to the rotating action of the helical blade 38 of the auger 22 acting on the fruit or vegetable to break the inserted fruit or vegetable down into combined pulp and juice. As the auger 22 is rotated the helical blade 38 urges the combined fruit or vegetable along the housing 21 and into the cavity 46 between the auger 22 and the inner wall 43. The combined pulp and juice is guided into the cavity 46 by the flange inclined face 62.

As the auger 22 continues to rotate the combined pulp and juice is urged along the cavity 46 towards the pulp outlet 26. However, although the width of the gap between the auger 22 and the inner wall 43 remains constant, it is recognised that the radius of the cavity 46 decreases in the direction along the longitudinal axis of the auger 22 towards the pulp outlet 26. Therefore, the cross-sectional area of the cavity 46 transverse to the axis, and the volume of the cavity 46 along the longitudinal axis of the auger 22 towards the front end of the housing 21, decreases. This causes the pressure imparted on the pulp and juice in the cavity 46 to increase as the pulp and juice is urged along the cavity 46 by the helical blade 38 of the auger 22. Therefore, although the pulp is constantly urged towards the open end of the housing 21 to be ejected from the cavity 46 through the pulp outlet 26, the increasing pressure in the cavity 46 causes the juice to flow in the opposite direction towards the aperture 52, and is urged to flow radially through the aperture 52 and into the juice passageway 44.

Therefore, the need for a sieve is eliminated and the arrangement of the masticating juicer is simplified in comparison to conventional masticating juicers.

As the auger 22 continues to be rotated, the pulp continues to be urged towards the pulp outlet and is ejected from the housing. Similarly, the juice is urged to flow along the cavity 46 in the opposite direction to the pulp and into the aperture 52. The juice then flows into the juice passageway 44 and can then easily flow through the juice outlet 35 at the base of the housing 21 to be collected. The pulp is prevented from flowing through the circumferentially extending aperture 52, however the juice is able to flow through the pulp along the aperture 52 and into the juice outlet 35. Therefore, the pulp and juice are separated from each other.

When the desired amount of juice has been obtained, rotation of the auger 22 is stopped. The rear portion 25 of the housing is separated from the front portion 24 of the housing 21 to allow access to the chamber 23, and the auger 22 can then be removed from the housing 21. Similarly, the inner wall 43 is removable from the housing 21 and the first and second parts 49, 50 are separable. Therefore, to clean the inner wall 43 and pulp fibres stuck in the aperture 52, the first part 49 is drawn away from the second part 50. Therefore, the opposing end faces 55, 56 of the first and second parts 49, 50 are separated and are able to be cleaned without a user needing to clean within the aperture itself.

Although in the above embodiment the first and second wall parts are located and mounted in the chamber by ribs and flanges, it will be appreciated that the masticating separator is not limited thereto and that the first and second wall parts may located and mounted by other means.

Although the inner wall 43 is formed from two insert parts which are spaced from each other to form an aperture in the inner wall in the above embodiment, it will be appreciated that the arrangement of the masticating separator is not limited thereto. For example, in an alternative embodiment the first and second parts are integrally formed such that the inner wall is formed as a single insert with an aperture formed therein. However, an advantage of the first and second parts being formed as two distinct parts is that they can be separated to allow the aperture to be easily cleaned and to prevent pulp from being retained in the aperture during cleaning.

Figure 3:
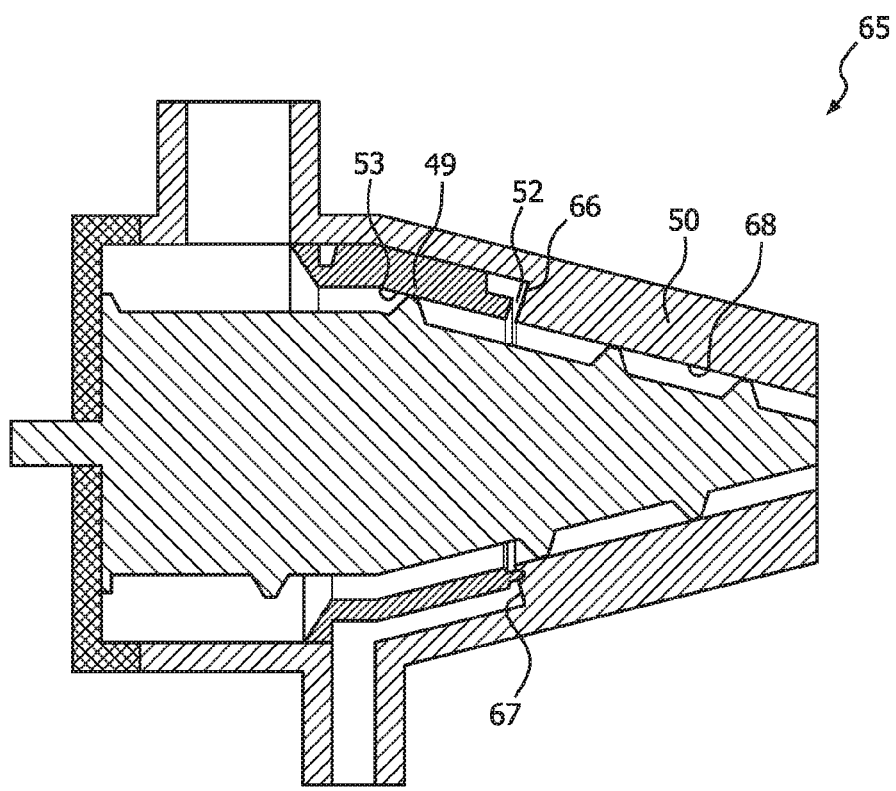
FIG. 3 shows an illustrative cross-sectional view of a masticating separator for separating a fruit or vegetable juice from a pulp according to another embodiment of the invention.

Alternatively, one of the parts may be integrally formed in the housing. Referring to FIG. 3, an alternative embodiment of a masticating separator 65 is described. This embodiment is generally the same as the above described embodiment, and a detailed description will be omitted herein and components and features will retain the same reference numerals. However, in the present embodiment the second part of the inner wall 43 is integrally formed with the housing 21.

In this embodiment, the second part 50 of the inner wall 43 is integrally formed with the housing 21 and forms a shoulder 66 extending circumferentially around the inner surface 45 of the housing 21. Therefore, the end face 56 of the second part 50 is formed by the circumferentially extending end wall 67 of the shoulder 66. When the first part 49 is inserted into the housing 21 the spacing elements 57 abut against the end wall of the shoulder 66 to space the end face 55 of the first part 49 from the shoulder 66 to define the aperture 52. The cavity 46 is then defined between a conical face 68 of the shoulder 66 and the outer surface 39 of the auger 22 and the inner face 53 of the first part 49 and the auger 22. It will be appreciated that the juice passageway 44 is formed between the outer face 54 of the first part 49 and the housing 21.

In the above described embodiments the aperture 52 is disposed at, or proximate to, the distal end of the inner wall 43 to the pulp outlet 26. An advantage of this arrangement is that only a very small amount of juice is retained in the cavity 46 at the end of the juicing operation.

However, it will be appreciated that the aperture 52 may be moved further along the inner wall so that it is disposed further in the cavity. An advantage of this arrangement is that the pressure in the cavity 46 increases along the cavity 46 towards the pulp outlet 26 and so the further along the cavity 46 towards the pulp outlet 26, the higher the pressure to urge the juice through the aperture 52.

Figure 4:
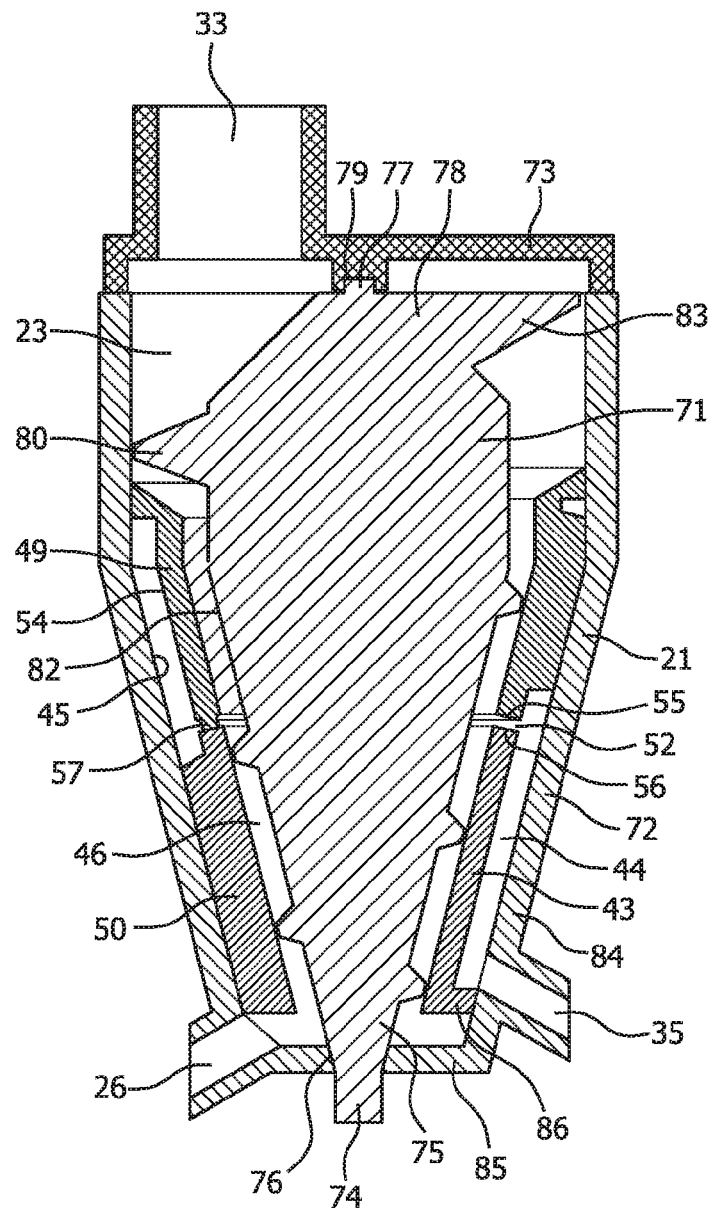
FIG. 4 shows an illustrative cross-sectional view of a masticating separator for separating a fruit or vegetable juice from a pulp according to another embodiment of the invention.
Figure 5:
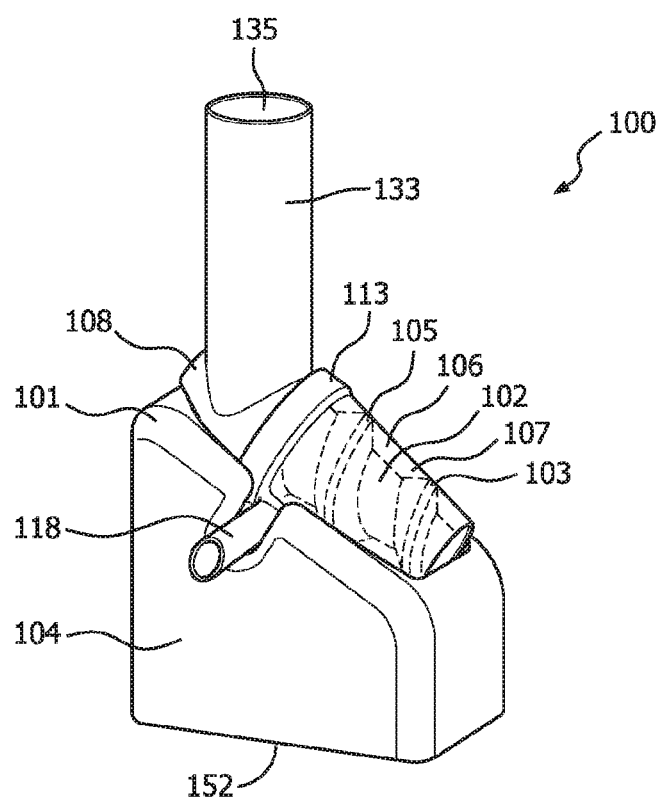
FIG. 5 shows an illustrative perspective view of a masticating separator for separating a fruit or vegetable juice from a pulp according to another embodiment of the invention.

In the above described embodiments the auger 22 is disposed in the housing to rotate about a horizontal axis. However, in an alternative arrangement an auger may be disposed in the housing and be configured to rotate about a vertically extending axis. Referring to FIG. 4, an alternative embodiment of a masticating separator 70 is described. This embodiment is generally the same as the above described embodiments, and a detailed description will be omitted herein and components and features will retain the same reference numerals. However, in the present embodiment an auger 71 is configured to rotate about a vertical axis in the housing 21.

The housing 21 has a lower portion 72 and an upper portion 73 which forms a cover. In this embodiment, the auger 71 is mounted on its longitudinal axis at each end by a shaft 74 at a lower end 75 of the auger 71 which extends through a corresponding shaft hole 76 formed through the housing 21, and a pin 77 at an upper end 78 received in a pin recess 79 formed in the upper portion 73 of the housing 21. The shaft 74 is mounted to and driven by a motor (not shown), or a manual handle, in a conventional manner to rotate the auger 71 in the housing 21 about its longitudinal axis. The masticating separator 70 has a base (not shown) which is arranged to support the housing 21 on a horizontal surface (not shown) such as a table or bench. Therefore, it will be appreciated that when the base is positioned on a surface, the longitudinal axis of the auger extends perpendicularly to the surface. An advantage of the auger being disposed to rotate about a vertically extending axis is that it reduces the space required by the masticating separator 70.

The upper portion 73 of the housing 21 has a fruit or vegetable inlet 33 formed through it so that a fruit or vegetable is insertable into the chamber 23 defined by the housing 21. The auger 71 has a helical screw or blade 80 extending about an outer surface 82 of the auger 71, and an upper section 83 of the helical blade 80 at the upper end 78 forms a cutting tooth rotating below the fruit or vegetable inlet 33 to reduce a fruit or vegetable to combined pulp and juice.

The juice outlet 35 is formed through a side wall 84 of the housing 81 spaced from a base wall 85 of the housing 21. Similarly, the pulp outlet 26 is formed through the side wall 84 of the housing 81, but extends from the base wall 85 of the housing 21.

The inner wall 43 is generally the same as in the above described embodiments, however in this embodiment the inner wall 43 has a lower flange 86 extending circumferentially around a lower end 87 of the second part 50 of the inner wall 43. When the second part 50 of the inner wall 43 is inserted into the housing 21, the lower flange 86 locates against the inner surface 45 of the housing 21, along with the ribs 63, to locate the second part 50 in the housing 76 so that it is spaced from the base wall 85. The lower flange 86 forms a fluid seal with the inner surface of the housing 21, and the juice outlet 35 extends from above an upper face of the lower flange 86 when the second part 50 is received in the housing 21. Therefore juice flowing in the juice passageway 44 formed between the housing 21 and the inner wall 43 flows into the juice outlet 35.

When the second part 50 of the inner wall 43 is disposed in the housing 21, the first part 49 is inserted into the housing 21 and is spaced from the second part 50 by the spacer elements 57 so that the aperture 52 is defined between the opposing end faces 55, 56 of the two parts of the inner wall 43. The flange 48 extending circumferentially about the first part 49 of the inner wall 43 forms an upper flange, such that the juice passageway 44 is defined between the outer face 54 of the inner wall 43, the inner surface 45 of the housing 21 and the upper and lower flanges. The auger 71 is then insertable into the housing 21 and its longitudinal axis upstands in a perpendicular direction from a surface on which the base (not shown) of the masticating separator 70 is disposed, and the masticating separator is then operated in a similar manner to that described above. An advantage of the auger 71 being arranged in a vertical orientation is that it arranges to the masticating separator to allow gravity to be used to let a fruit or vegetable to be fed through the masticating separator and for juice to flow from the housing.

Although in the above described embodiment the longitudinal axis of the auger 71 about which the auger rotates is disposed to extend at an angle of 90 degrees from the surface on which the separator is disposed, it will be appreciated that in an alternative embodiment the longitudinal axis of the auger extends at another angle so that the axis is not parallel to the surface.

Although in the above described embodiment the juice passageway 44 is defined at each end by upper and lower circumferentially extending flanges, it will be appreciated that the masticating separator is not limited thereto. For example, in another embodiment a circumferentially extending shoulder (not shown) may upstand from the lower end of the housing 21 against which the lower end of the second part of the inner wall abuts, with a bore formed through the shoulder to outside the housing to form the pulp outlet. Alternatively, or in addition to, the outer face of the first part of the inner wall abuts the inner surface of the housing such that the fluid passageway is formed between the second part of the inner wall and the inner surface of the housing.

Furthermore, although in the above embodiment the inner wall is formed from two distinct parts which are separable from each other, it will be appreciated that in an alternative embodiment the first and second parts 49, 50 of the inner wall 43 are integrally formed with each other. This aids removal of the inner wall 43 from the housing 21. However, an advantage of the first and second parts 49, 50 being separable is that it enables easy cleaning of the aperture 52.

Although in the above embodiments the outer surface 39 of the auger 22 extends parallel to, but spaced from, the inner face 53 of the inner wall 43 along the longitudinal axis of the auger 22 when the auger 22 is received in the housing 21, it will be appreciated that the arrangement of the masticating separator is not limited thereto. For example, in an alternative arrangement the outer surface 39 of the auger 22 and the inner face 53 of the inner wall 43 converge towards each other in a direction along the longitudinal axis of the auger 22 to the front end of the housing 21. This arrangement will further decrease the cross-sectional area of the cavity 46 and so a greater pressure will be imparted on the pulp and juice in the cavity 46 as the auger urges the pulp and juice along the cavity 46 towards the pulp outlet 26. Therefore, the juice in the cavity will be further urged back along the cavity 46 and to flow out of the cavity through the aperture 52. It will be appreciated in this arrangement that the free edge 42 of the helical blade 38 will converge towards the outer surface 39 of the auger 22 so that the free edge 42 of the helical blade 38 extends parallel to the inner wall 43.

Another embodiment of a masticating separator will now be described. It will be understood that features of the masticating separator described herein may also be used in combination with the features of the masticating separator described above.

Referring now to FIGS. 5 to 8, a masticating separator 100 acting as a masticating juicer for separating fruit or vegetable juice from pulp is shown. The masticating separator comprises a body 101 and a rotatable auger 102 disposed in the body 101. The body 101 includes a housing 103 and a base unit 104. The rotatable auger 102 is received in the housing 103 and is rotatable therein. The housing 103 is removably mounted to the base unit 104. The base unit 103 supports the housing 103 and also orientates the housing 103 in its correct orientation for operation. Although the base unit 104 and housing 103 are two separable parts in the present arrangement, it will be understood that the base unit 104 and at least part of the housing 103 may be integrally formed. An advantage of the housing 103 being removable from the base unit 104 is that the housing 103 may be easily cleaned. Furthermore, removal and positioning of the auger 102 in the housing 103 is simplified.

The housing 102 of the body 101 comprises an outer shell 105 and a chamber 106. The chamber 106 is formed in the housing 102 to receive the rotatable auger 103. The housing 102 has a front portion 107 and a rear portion 108. The front and rear portions 107, 108 are separable from each other. An engagement arrangement 113 releasably mounts the front and rear portions 107, 108 to each other. The engagement arrangement 113 forms a fluid seal between the two portions 107,108.

The front and rear portions 107, 108 of the housing 102 are separable to allow access to the chamber 106. Therefore, the auger 102 is removable from the housing 102 for cleaning, as will become apparent hereinafter.

The front portion 107 of the housing 102 is generally conical. The front portion 107 comprises a conical section 109 extending from a front end 110 to a rear end 111. A cylindrical section 112 is formed at the rear end 111 of the front portion 107. A side wall 114 of the front portion 107 converges from the rear end 111 to the front end 110. A front end wall 115 is formed at the front end 110. An aperture is formed through the front end wall 115 to form a pulp outlet 116 (refer to FIG. 8) through which pulp is discarded from the housing 102, as will become apparent hereinafter. With the pulp outlet 116, the front end 110 is open and communicates between the chamber 106 and outside the housing 102. The side wall 114 of the front portion 107 forms the front side wall of the housing 102.

Figure 6:
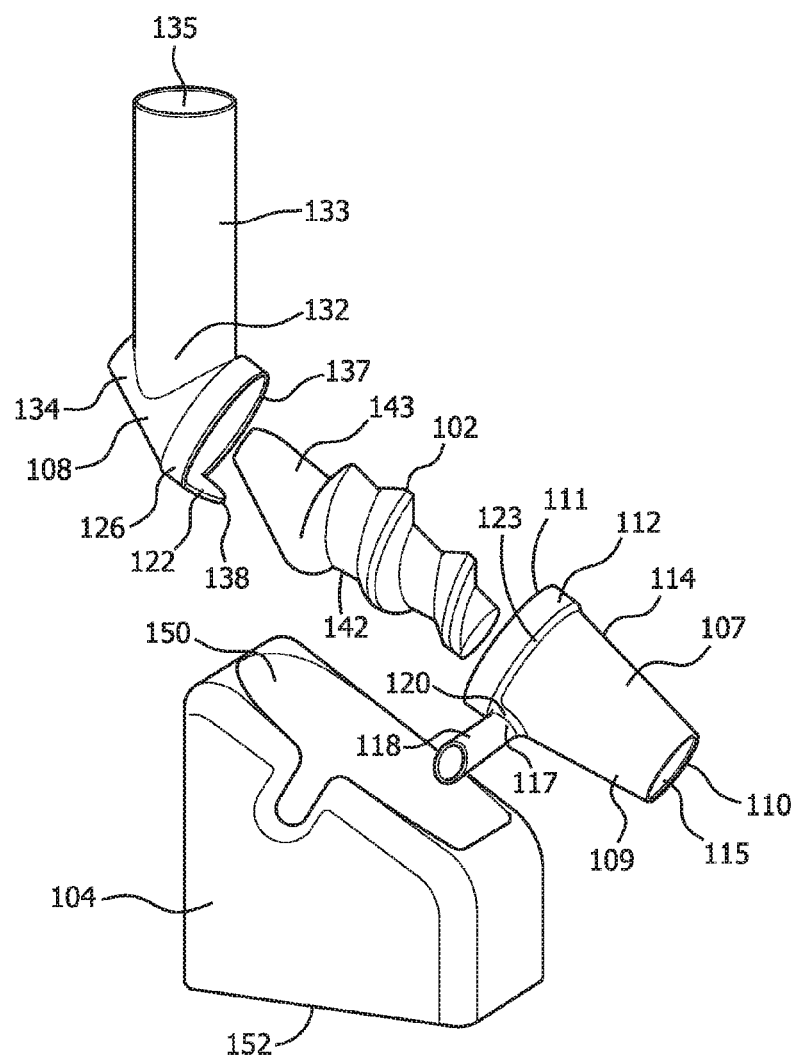
FIG. 6 shows an exploded illustrative perspective view of the masticating separator shown in FIG. 5.
Figure 7:
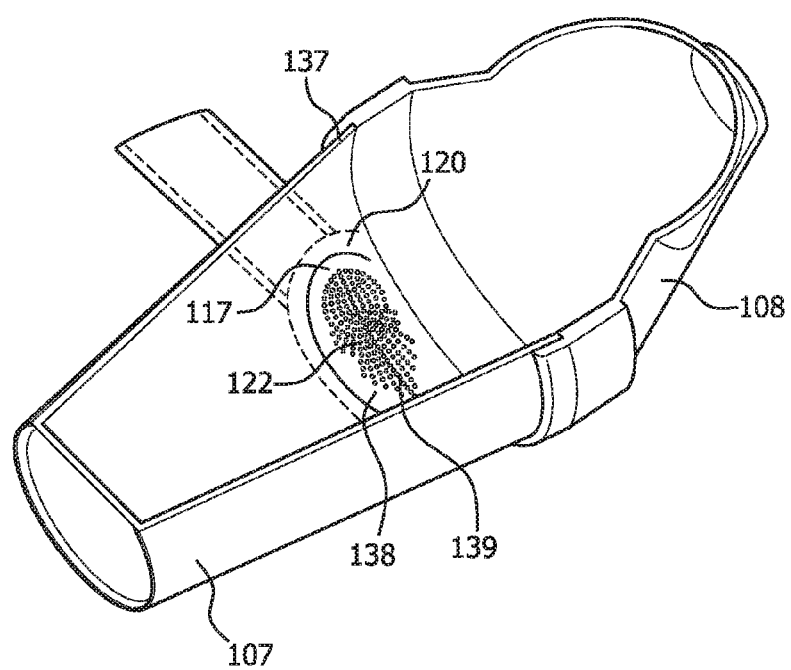
FIG. 7 shows a partial cut-away illustrative perspective view of a housing of the masticating separator shown in FIG. 5 with the auger removed.
Figure 8:
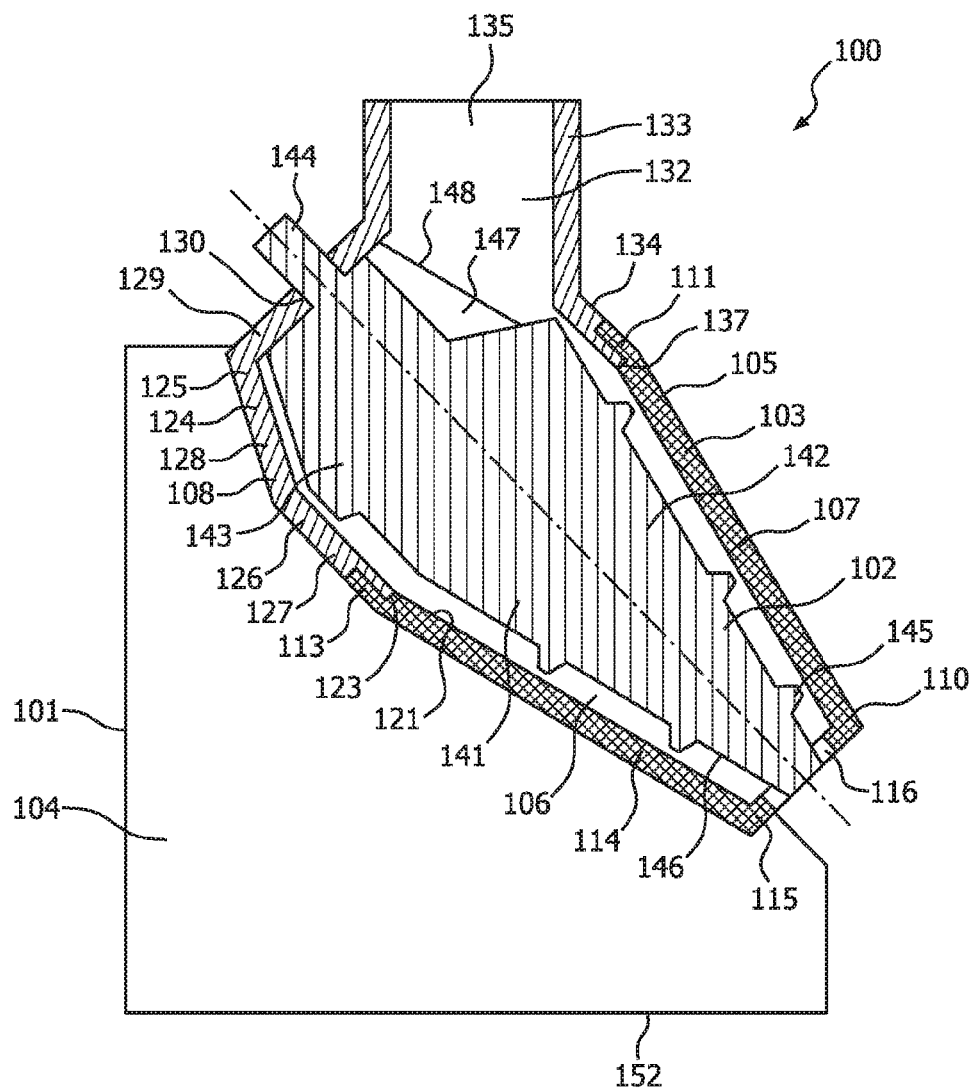
FIG. 8 shows an illustrative cross-sectional side view of the masticating separator shown in FIG. 5.

Referring in particular to FIGS. 6 and 7, an opening 117, acting as a juice outlet, is formed through the front side wall 114. A pipe 118 extends from the opening 117. Therefore, juice fed through the juice outlet 117 from the chamber 106 is guided by the pipe 118. The pipe 118 is open at its free end so that juice flowing along the pipe 118 is able to flow into a container (not shown).

A recess 120 is formed in an inner surface 121 of the front side wall of the housing 102. The recess 120 extends around the juice outlet 117. The bottom surface of the recess 120 is concave. The bottom surface slopes towards the juice outlet 117. The recess 120 is configured to receive a sieve 122, as will become apparent hereinafter.

The cylindrical section 112 of the front portion 107 extends from the rear end of the conical section 109. A step 123 is formed in the inner surface 121 of the front side wall 114 of the housing 102. The step 123 extends circumferentially around the inner surface 121 of the front side wall 114. The edge of the recess 120 extends to the step 123 formed in the inner surface 121 of the housing front portion 107. That is, in the present embodiment the recess 120 extends to and communicates with a lip of the conical section 109 of the front portion 107.

The rear portion 108 of the housing 102 is generally conical. The rear portion 108 comprises a conical section 124 extending from a rear end 125 to a front end 126. A cylindrical section 127 is formed at the front end 126 of the rear portion 108. A side wall 128 of the rear portion 108 converges from the front end 126 to the rear end 125. Therefore, the housing 102 converges towards each of its front and rear ends. A rear end wall 129 is formed at the rear end 125. A shaft-receiving aperture 130 (refer to FIG. 8) is formed through the rear end wall 129. The side wall 128 of the front portion 108 forms the rear side wall of the housing 102. That is, the front side wall 114 and the rear side wall 128 together form the side wall of the housing 102.

An opening 132 is formed in the rear side wall 128 of the rear portion 108. The opening 132 acts as a fruit and/or vegetable inlet. A tube 133 upstands from an outer surface 134 of the housing 102 and extends around the opening 132. The tube 133 forms part of the fruit and/or vegetable inlet and acts as a passage 135 which communicates with the chamber 106. Therefore, a fruit or vegetable fed into the passage 135 is fed into the chamber 106. The passage 135 is elongate and has a longitudinal axis.

The cylindrical section 127 of the rear portion 108 extends from the conical section 123. The cylindrical section 127 has a rim 137 which extends circumferentially around the rear portion 108.

The sieve 122 protrudes from the rim 137. The sieve 122 is formed by a panel 138 with a plurality of sieve apertures 139 formed therethrough. The panel 138 is arcuate and corresponds to the arc of the inner surface of the 121 of the front side wall 114. The sieve apertures 139 extend between an outer side and inner side of the panel 138. The sieve apertures 139 are sized to allow juice to flow through the apertures 139, but to prevent the flow of pulp therethrough. The sieve apertures 139 are configured so that pulp fibres collate at the inner side of the panel 138 to obstruct the sieve apertures 139. The juice is then filtered through the pulp fibres collated at the inner side of the panel 138 and pass through the sieve apertures, to create a cake filtration process. This means that it is possible to use holes with an increased diameter as the collated pulp fibres act as a filter. Therefore, the efficiency of the juice filtration is maximised and it is easier to clean the sieve 122.

When the front and rear portions are brought together, the rim 137 of the front end 126 of the housing rear portion 108 is received in the rear end 111 of the housing front portion 107. The rim 137 abuts the step 123 formed in the inner surface 121 of the front side wall 114 of the housing 102. Furthermore, the cylindrical section 112 of the front portion 107 overlaps the cylindrical section 127 of the rear portion 108 to form the engagement arrangement 113. Therefore, the front and rear portions 107, 108 engage with each other and a fluid seal is formed therebetween.

As the front and rear portions 107, 108 are brought together the sieve 122 is received in the front portion 107, and is received in the recess 120 formed in the inner surface 121 of the front side wall of the housing 102. The sieve 122 extends over the juice outlet 117. An outer edge of the sieve 122 locates against an outer edge of the recess 120. As the bottom surface of the recess 120 is concave, the outer face of the sieve is spaced from the bottom surface extending around the juice outlet 117. Therefore, the size of the sieve 122 is able to exceed the dimensions of the juice outlet 117. A fluid passageway is defined from the sieve 122 to outside the housing 103.

The auger 102 has an auger body 141 with a pressing portion 142 and a chopping portion 143. A shaft 144 extends from a rear end of the auger body 141. The shaft 144 is integrally formed with the auger body 141 and extends along the longitudinal axis of the auger 102. The auger 102 is configured to rotate about its longitudinal axis. The pressing portion 142 is conical and converges from a rear end to a front end. A helical screw or blade 145 extends around an outer surface 146 of the pressing portion 142 from the rear end to the front end. The chopping portion 143 extends from the rear end of the pressing portion 142. The chopping portion 143 has a chopping element 147, for example a blade. The chopping element 147 has a cutting edge 148. The cutting edge 148 extends at an oblique angle to the rotational axis of the auger 102.

The shaft 144 is configured to be rotatably driven by a motor (not shown) disposed in the base unit 104. The shaft 144 is connected to the shaft 144 by a drive mechanism (not shown). Therefore the auger 102 is rotated when the motor is operated. In the present embodiment a free edge of the helical blade 145 is spaced equidistant from the outer surface 146 of the auger body 141 along its length, however it will be appreciated that the height of the blade 145 may vary along its length.

The base unit 104 contains the motor (not shown) and other components for operating the masticating separator. The base unit 104 has a holder 150 for supporting the housing 103. The holder 150 is disposed at an upper end of the base unit 104. The holder 150 in the present embodiment is a recess formed in the base unit 104. The holder 150 is configured to partially receive the housing 103 so that the housing 103 is orientated in a defined position with respect to the base unit 104. Therefore, when the housing 103 is received by the holder 150, the housing 103 and base unit 104 are orientated in a predetermined position with respect to each other. The pipe 118 is received in an extended portion of the holder 150. The pipe locates against the base unit 104 to orientate the housing 103 with respect to the base unit 104 about its longitudinal axis. The free end of the pipe 118 protrudes from the base unit 104.

The base unit 104 defines a base. The base is configured to support the body 101 on a horizontal surface. The base defines a base plane. That is, the base plane is a plane which is configured to extend co-planer with the plane of a horizontal surface when the body 101 of the masticating separator 100 is positioned on the horizontal surface.

In the present embodiment the base unit 104 has a base surface 152. The base surface 152 is configured to be positioned against a horizontal surface when the body 101 of the masticating separator 100 is positioned on the horizontal surface. The base surface 152 in the present embodiment defines the base.

It will be understood that the base surface 152 may be defined by two or more surface portions which are spaced from each other. For example, the base unit 104 may have feet which are configured to support the body 101 on a horizontal surface. In such an arrangement it will be understood that the lower face of the feet form the surface portions of the base surface. Therefore, the lower face of the feet together define the base.

When the masticating separator 100 is assembled, the auger 102 is received in the housing 103. The auger 102 is inserted into one or both of the front and rear portions 107, 108 and the front and rear portions are brought together. When the auger 102 is received in the housing 103 the shaft 144 protrudes through the shaft-receiving aperture 130 formed through the rear end wall 129 of the housing 103 so that it is engagable with the drive mechanism (not shown). The front end of the auger 102 extends to the pulp outlet 116. The longitudinal axis of the auger 102 extends parallel to the longitudinal axis of the housing 103. The pressing portion 142 is received in the front portion 107 of the housing 103. The chopping portion 143 is received in the rear portion 108 of the housing 103.

When the auger 102 and housing 103 are assembled together, the opening 132 formed in the rear side wall 128 of the rear portion 108, and acting as a fruit and/or vegetable inlet, opposes the chopping portion 143 of the auger 102. The longitudinal axis of the passage 135 intersects the chopping portion 143 of the auger 102. Therefore, when fruit or vegetables are fed through the opening 132 into the chamber 106, they are fed directly to the chopping portion 143.

As the front and rear portions 107, 108 are brought together the sieve 122 is aligned with and received in the front portion 107, and is received in the recess 120 formed in the inner surface 121 of the front side wall of the housing 102. Therefore, the sieve 122 and the recess 120 orientate the front and rear portions 107, 108 with respect to each other. The pipe 118, acting as the juice outlet, is orientated with respect to the opening 132 and therefore the passage 135 extending from the opening 132.

When the auger 102 is assembled with the housing 103, the rotational axis of the auger, which corresponds to the longitudinal axis of the auger, extends at an oblique angle to the rear side wall 128 of the rear portion 108. That is, the rear side wall 128 of the rear portion 108 is neither perpendicular nor parallel to the rotational axis of the auger. Therefore, it will be understood that the opening extends at an oblique angle to the rotational axis of the auger.

Furthermore, the longitudinal axis of the passage 135 extending from the opening 132 extends at an oblique angle to the longitudinal axis of the auger.

In the present embodiment, the longitudinal axis of the passage 135 extends at an angle of 60 degrees to the rotational axis of the auger 102. Preferably the angle between the longitudinal axis of the passage 135 and the rotational axis of the auger 102 is in the range of 15 degrees to 80 degrees.

An advantage of at least the portion of the side wall 128 in which the opening 132 is formed extending at an oblique angle to the rotational axis of the auger is that the area of the opening 132 can be maximised. The area of the opening 132, and therefore the area of the passage 135, may be increased.

With the auger 102 described above, the chopping element 147 is formed in a conical arrangement. The chopping element 147 is received in the conical rear portion 108 of the housing 102. Therefore, the cutting edge 148 of the chopping portion 143 extends at an oblique angle to the rotational axis of the auger 102. That is the cutting edge 148 is neither perpendicular nor parallel to the rotational axis of the auger 102. With the chopping portion 143 being implemented as a conical arrangement as described above, fruit or vegetables fed into the chamber 106 are sliced by the cutting edge 148 and are urged towards the pressing portion 142 of the auger. Therefore, the masticating separator 101 is self-feeding and does not require a pressing force to be provided to urge the fruit and/or vegetable against the auger. With a conventional horizontal masticating separator the fruit or vegetable is fed into the chamber in a radial direction. Therefore, the fruit or vegetable is not urged towards the pressing portion 142 of the auger without a constant urging force being maintained by a user on the fruit or vegetable.

Once the housing 103 and auger 102 are assembled, the housing 103 and base unit 104 are then brought together. The housing 103 is received in the holder 150 so that the base unit 104 supports the housing 103. The holder 150 is formed on the upper side of the base unit 104, on an opposing side of the base unit 104 to the base surface 152. The pipe 118, acting as the juice outlet, is received in the extended portion of the holder 150. The pipe locates against the base unit 104 to orientate the housing 103 with respect to the base unit 104 about its longitudinal axis. The free end of the pipe 118 protrudes from the base unit 104. Therefore, separated juice flowing along the pipe 118 is able to flow into a juice container (not shown). The longitudinal axis of the pipe 118 extends at an acute angle to the base surface 152.

When the body 101 is assembled, the housing 103 is supported by the base unit 104 in a predetermined position. The auger 102 is therefore held in a desired orientation with respect to the body 101. The rotational axis of the auger 102 extends as an oblique angle to the base defined by the base unit 104. That is, the rotational axis of the auger 102 is neither perpendicular nor parallel to the base surface 152 which is configured to be positioned against a horizontal surface when the body 101 of the masticating separator 100 is positioned on the horizontal surface.

In the present embodiment, the rotational axis of the auger 102 extends at an angle of 30 degrees to the base surface 152. Preferably the angle between the rotational axis of the auger 102 and the plane of the base surface 152 is in the range of 15 degrees to 80 degrees.

When the masticating separator is operated, the auger 102 is rotatably driven by the motor (not shown) via the drive mechanism (not shown) so that the auger 102 rotates in the housing about its rotational axis. Fruit or vegetable fed into the chamber 106 through the opening 132 is chopped by the chopping portion 143 of the auger as described above. The fruit or vegetable is then urged to the pressing portion 142 of the auger 142 as the auger 102 rotates in the housing 103. The height of the helical screw 145 is constant along its length. The free edge of the helical screw 145 lies adjacent to the side wall 114 of the front portion 107.

As the auger 102 rotates, the helical blade 145 urges the combined pulp and juice along the cavity between the auger 102 and the front portion 107 of the housing 103.

As the auger 102 continues to rotate the combined pulp and juice is urged along the cavity towards the pulp outlet 116. However, although the width of the gap between the auger 102 and the housing 103 remains generally constant, it is recognised that the radius of the auger 102 decreases in the direction along the longitudinal axis of the auger 102 towards the pulp outlet 116. Therefore, the cross-sectional area of the cavity transverse to the axis, and the volume of the cavity along the longitudinal axis of the auger 102, decreases towards the front end of the housing. This causes the pressure imparted on the pulp and juice in the cavity to increase as the pulp and juice is urged along the cavity by the helical blade 145 of the auger 102. Therefore, although the pulp is constantly urged towards the open end of the housing 103 to be ejected through the pulp outlet 116, the increasing pressure causes the juice to flow in the opposite direction towards the sieve apertures 139 of the sieve 138, and the juice is then urged to flow through the sieve 138. The juice is urged through the sieve apertures 139 due to the reduced resistance to flow at the sieve apertures 139.

As the auger 102 continues to be rotated, the pulp continues to be urged towards the pulp outlet 116 and is ejected from the housing 103. Similarly, the juice is urged to flow along the through the sieve apertures 139. The juice then flows through the opening 117, acting as a juice outlet, formed through the front side wall 114 to be collected. The pulp is prevented from flowing through the sieve apertures 139 and so the pulp and juice are separated from each other.

When the desired amount of juice has been obtained, rotation of the auger 102 is stopped. The rear portion 108 of the housing is drawn away from the front portion 107 of the housing 103 and the auger 102 withdrawn. Therefore, it will be understood that the masticating separator is easily disassembled and the ease of cleaning the apparatus is maximised. Furthermore, it will be understood that the sieve 122 is separated from the juice outlet and so pulp fibres are easily removed from the sieve apertures 139. Therefore, the sieve is easily cleaned.

Many other modifications and variations will be evident to those skilled in the art.

Aspects

1. A masticating separator for separating fruit or vegetable juice from fruit or vegetable pulp comprising a body with a base configured to support the body on a horizontal surface, an auger rotatably mounted in the body about a rotational axis, wherein the rotational axis of the auger is configured to extend at an oblique angle to the base.

2. A masticating separator according to aspect 1, wherein an opening is formed in a side wall of the body extending around the auger to act as a fruit or vegetable inlet so that a fruit or vegetable is feedable to the auger, and at least the portion of the side wall in which the inlet is formed extends at an oblique angle to the rotational axis of the auger.

3. A masticating separator according to aspect 2, wherein the auger comprises a chopping portion and a pressing portion.

4. A masticating separator according to aspect 3, wherein the opening is configured to face the chopping portion.

5. A masticating separator according to any of aspects 1 to 4, wherein the housing further comprises an elongate passage configured to feed a fruit or vegetable to the opening, the longitudinal axis of the elongate passage extending at an oblique angle to the rotational axis of the auger.

6. A masticating separator according to aspect 3, wherein a cutting edge of the chopping portion extends at an oblique angle to the rotational axis of the auger.

7. A masticating separator according to any preceding aspect, wherein the base is defined by a base surface.

8. A masticating separator according to aspect 7, wherein the base surface is defined by two or more surface portions which are spaced from each other.

9. A masticating separator according to any preceding aspect wherein the body comprises a base unit defining the base and a housing mountable to the base unit.

10. A masticating separator according to aspect 9, wherein the auger is received in a chamber formed by the housing.

11. A masticating separator according to aspect 9 or aspect 10, wherein the chamber is elongate and converges towards each end.

12. A masticating separator according to aspect 11, wherein the housing comprises first and second portions which are separable from each other.

13. A masticating separator according to aspect 12, wherein the first portion has a juice outlet, and the second portion has a sieve configured to extend over the juice outlet when the first and second portions are mounted to each other.

14. A masticating separator according to aspect 1, further comprising a housing, an inner wall in the housing, a cavity defined between an outer surface of the auger and the inner wall to receive pulp and juice, and a juice passageway separated from the cavity, wherein an elongate aperture is formed in the inner wall extending between the cavity and the juice passageway so that, when the auger is rotated about its longitudinal axis to urge pulp and juice along the cavity, juice in the cavity is urged to flow through the aperture to the juice passageway.

Although the above exemplary embodiment relates to a masticating juicer for separating juice from pulp, it will be appreciated that the invention is not limited thereto and that such an above described apparatus may be used to separate other combined liquids and solids.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A masticating separator for separating fruit or vegetable juice from fruit or vegetable pulp comprising:
    a housing,
    an inner wall in the housing, said inner wall adjacent to an auger rotatably mounted in the housing, wherein the inner wall has an elongate aperture for accommodating juices therethrough, and wherein the inner wall comprises a first part and a second part, the first and second parts being separable along the elongate aperture,
    a cavity defined between an outer surface of the auger and the inner wall to receive pulp and juice, and
    a juice passageway separated from the cavity, wherein rotation of the auger about its longitudinal axis urges juice in the cavity to flow through the elongate aperture to the juice passageway.

2. The masticating separator according to claim 1, wherein the inner wall is conically shaped.

3. The masticating separator according to claim 1, wherein the elongate aperture extends circumferentially around the inner wall.

4. The masticating separator according to claim 1, wherein a pulp outlet is formed at one end of the housing and the auger is configured to urge pulp and juice towards said pulp outlet.

5. The masticating separator according to claim 4, wherein the elongate aperture is spaced from the pulp outlet.

6. The masticating separator according to claim 5, wherein the elongate aperture is disposed proximate an opposing end of the inner wall to the pulp outlet.

7. The masticating separator according to claim 1, wherein the first part is removably received in the housing.

8. The masticating separator according to claim 1, wherein the second part is removably received in the housing.

9. The masticating separator according to claim 1, wherein the second part is integrally formed with the housing.

10. The masticating separator according to claim 1, wherein the first part has an end face which is spaced from an opposing end face of the second part to form the aperture.

11. The masticating separator according to claim 10, further comprising a spacer means configured to space the end face of the first part from the opposing end face of the second part.

12. The masticating separator according to claim 11, wherein the spacer means protrudes from one of the opposing end faces and locates against the opposing end face to space the first part from the second part.

13. The masticating separator according to claim 1, further comprising:
    a base to support the housing on a surface, wherein the longitudinal axis of the auger is configured to extend at an angle to a surface on which the base is disposed.

14. The masticating separator according to claim 13, wherein the longitudinal axis of the auger is configured to upstand from the base, perpendicular to a surface on which the base is disposed.

* * * * *